US008902206B2

(12) United States Patent
Horibata

(10) Patent No.: US 8,902,206 B2
(45) Date of Patent: Dec. 2, 2014

(54) DISPLAY DEVICE AND ELECTRONIC EQUIPMENT THEREWITH

(75) Inventor: Hiroyuki Horibata, Gifu (JP)

(73) Assignee: Japan Display West Inc., Aichi-ken (JP)

( * ) Notice: Subject to any disclaimer, the term of this patent is extended or adjusted under 35 U.S.C. 154(b) by 1318 days.

(21) Appl. No.: 12/022,829

(22) Filed: Jan. 30, 2008

(65) Prior Publication Data

US 2008/0204436 A1 Aug. 28, 2008

(30) Foreign Application Priority Data

Feb. 22, 2007 (JP) ................................. 2007-042568

(51) Int. Cl.
*G06F 3/038* (2013.01)
*G09G 3/36* (2006.01)

(52) U.S. Cl.
CPC ........ *G09G 3/3696* (2013.01); *G09G 2330/021* (2013.01)
USPC ............................................ 345/211; 345/87

(58) Field of Classification Search
CPC ........ G09G 3/3696; G09G 2330/02–2330/028
USPC .................... 345/87–104, 204–215, 690–699
See application file for complete search history.

(56) References Cited

U.S. PATENT DOCUMENTS

| | | | | |
|---|---|---|---|---|
| 5,715,436 | A * | 2/1998 | Kawai et al. | 345/505 |
| 6,266,041 | B1 * | 7/2001 | Cairns et al. | 345/100 |
| 6,504,523 | B1 * | 1/2003 | Sugawara et al. | 345/98 |
| 7,129,921 | B2 * | 10/2006 | Yeon et al. | 345/89 |
| 7,209,104 | B2 | 4/2007 | Nakajima et al. | |
| 7,362,297 | B2 | 4/2008 | Koyama | |
| 2001/0022571 | A1 * | 9/2001 | Nakano et al. | 345/98 |
| 2002/0195955 | A1 * | 12/2002 | Kudo et al. | 315/169.1 |
| 2004/0196279 | A1 * | 10/2004 | Kim et al. | 345/211 |
| 2005/0001804 | A1 * | 1/2005 | Motai | 345/90 |
| 2006/0267902 | A1 * | 11/2006 | Akiyama et al. | 345/98 |
| 2007/0035499 | A1 * | 2/2007 | Lee et al. | 345/94 |
| 2007/0139320 | A1 * | 6/2007 | Deane et al. | 345/87 |

FOREIGN PATENT DOCUMENTS

| | | |
|---|---|---|
| CN | 1497517 | 5/2004 |
| JP | 2004-4243 | 1/2004 |
| JP | 2004-146082 | 5/2004 |
| JP | 2004-226786 | 8/2004 |

* cited by examiner

*Primary Examiner* — Patrick F Marinelli
(74) *Attorney, Agent, or Firm* — K&L Gates LLP

(57) ABSTRACT

Reduction in efficiency of a power supply circuit in a display device is prevented. A positive power supply generation circuit and a negative power supply generation circuit are placed close to a terminal portion to which a drive clock and a power supply electric potential are applied externally. The terminal portion 140 is formed in an edge portion of the TFT glass substrate 100. That is, the positive power supply generation circuit 131 and the negative power supply generation circuit 132 are placed closer to the terminal portion 140 than primary circuits of the liquid crystal display device, which are the pixel portion 105, the horizontal drive circuit 110 and the vertical drive circuit 120. With this, there is obtained a layout that minimizes wiring loads (resistive and capacitive loads associated with wirings to provide the power supply and the drive clock) to prevent reduction in circuit efficiency.

6 Claims, 9 Drawing Sheets

DISPLAY DEVICE AND ELECTRONIC EQUIPMENT THEREWITH

CROSS REFERENCE TO RELATED APPLICATIONS

This application claims priority from Japanese Patent Application No. 2007-042568, the content of which is incorporated herein by reference in its entirety.

BACKGROUND

1. Field of the Invention

This invention relates to a display device provided with a power supply circuit and electronic equipment provided with the display device.

2. Description of the Related Art

In an active matrix type liquid crystal display device that is manufactured by a low temperature polysilicon TFT (Thin Film Transistor) technology, a power supply circuit that generates a positive power supply electric potential and a negative power supply electric potential to control turning on/off of pixel TFTs has been formed on a glass substrate of a liquid crystal panel in order to reduce a cost of a drive signal IC (Integrated Circuit). A horizontal transfer clock that drives a horizontal drive circuit, a vertical transfer clock that drives a vertical drive circuit or a dedicated clock is supplied from a driver IC as a drive clock to drive the power supply circuit. This kind of active matrix type liquid crystal display device is disclosed in Japanese Patent Application Publication No. 2004-146082.

When the power supply circuit is formed on the glass substrate of the liquid crystal panel, the power supply circuit is placed in an unused space in a frame of the glass substrate. The drive clock to drive the power supply circuit and a power supply electric potential are supplied to the power supply circuit through wirings from a terminal portion that is also placed on the glass substrate.

SUMMARY

When the power supply circuit is disposed at a location far from the terminal portion, however, a wiring load (resistive and capacitive loads associated with the wirings to provide the power supply and the drive clock) is increased to cause problems such as reduction in efficiency of the power supply circuit, increase in power consumption and display failures.

This invention offers a display device including a pixel portion in which a plurality of pixel transistors are arrayed in a matrix form, a drive circuit to drive the pixel transistors, a positive power supply generation circuit to generate a positive power supply electric potential to drive the drive circuit, a negative power supply generation circuit to generate a negative power supply electric potential to drive the drive circuit, a terminal portion to externally apply a drive clock and a power supply electric potential to drive the positive power supply generation circuit and the negative power supply generation circuit, and a wiring disposed between the terminal portion and both the positive power supply generation circuit and the negative power supply generation circuit in order to supply the drive clock and the power supply electric potential, wherein the positive power supply generation circuit and the negative power supply generation circuit are placed closer to the terminal portion than the pixel portion and the drive circuit and are placed at substantially the same distance from the terminal portion.

With the structure described above, a wiring load can be reduced to prevent reduction in efficiency of the power supply generation circuits as well as preventing reduction in efficiency of either the positive power supply generation circuit or the negative power supply generation circuit due to an unbalanced wiring load, since the positive power supply generation circuit and the negative power supply circuit are placed close to the terminal portion and are placed at substantially the same distance from the terminal portion.

This invention also offers a display device including a pixel portion in which a plurality of pixel transistors are arrayed in a matrix form, a positive power supply generation circuit to generate a positive power supply electric potential to control switching of the pixel transistors, a negative power supply generation circuit to generate a negative power supply electric potential to control switching of the pixel transistors, a terminal portion to externally apply a drive clock and a power supply electric potential to drive the positive power supply generation circuit and the negative power supply generation circuit, and a wiring disposed between the terminal portion and both the positive power supply generation circuit and the negative power supply generation circuit in order to supply the drive clock and the power supply electric potential, wherein the positive power supply generation circuit and the negative power supply generation circuit are placed at substantially the same distance from the terminal portion.

With the structure described above, reduction in efficiency of either the positive power supply generation circuit or the negative power supply generation circuit due to an unbalanced wiring load can be prevented, since the positive power supply generation circuit and the negative power supply circuit are placed at substantially the same distance from the terminal portion.

This invention also offers a display device including a pixel portion in which a plurality of pixel transistors are arrayed in a matrix form, a positive power supply generation circuit to generate a positive power supply electric potential to control switching of the pixel transistors, a negative power supply generation circuit to generate a negative power supply electric potential to control switching of the pixel transistors, a terminal portion to externally apply a drive clock and a power supply electric potential to drive the positive power supply generation circuit and the negative power supply generation circuit, and a wiring disposed between the terminal portion and both the positive power supply generation circuit and the negative power supply generation circuit in order to supply the drive clock and the power supply electric potential, wherein the negative power supply generation circuit is placed closer to the terminal portion than the positive power supply generation circuit.

With the structure described above, a leakage due to reduction in circuit efficiency of the negative power supply generation circuit can be prevented because the negative power supply generation circuit that has a small margin of a rise in the negative power supply electric potential due to a wiring load is placed closer to the terminal portion than the positive power supply generation circuit.

This invention also offers electronic equipment using the display device described above. This invention offers excellent electronic equipment that does not cause an increase in power consumption or a display failure because the efficiency of the power supply circuit is not reduced.

DETAILED DESCRIPTION

Figure 1:
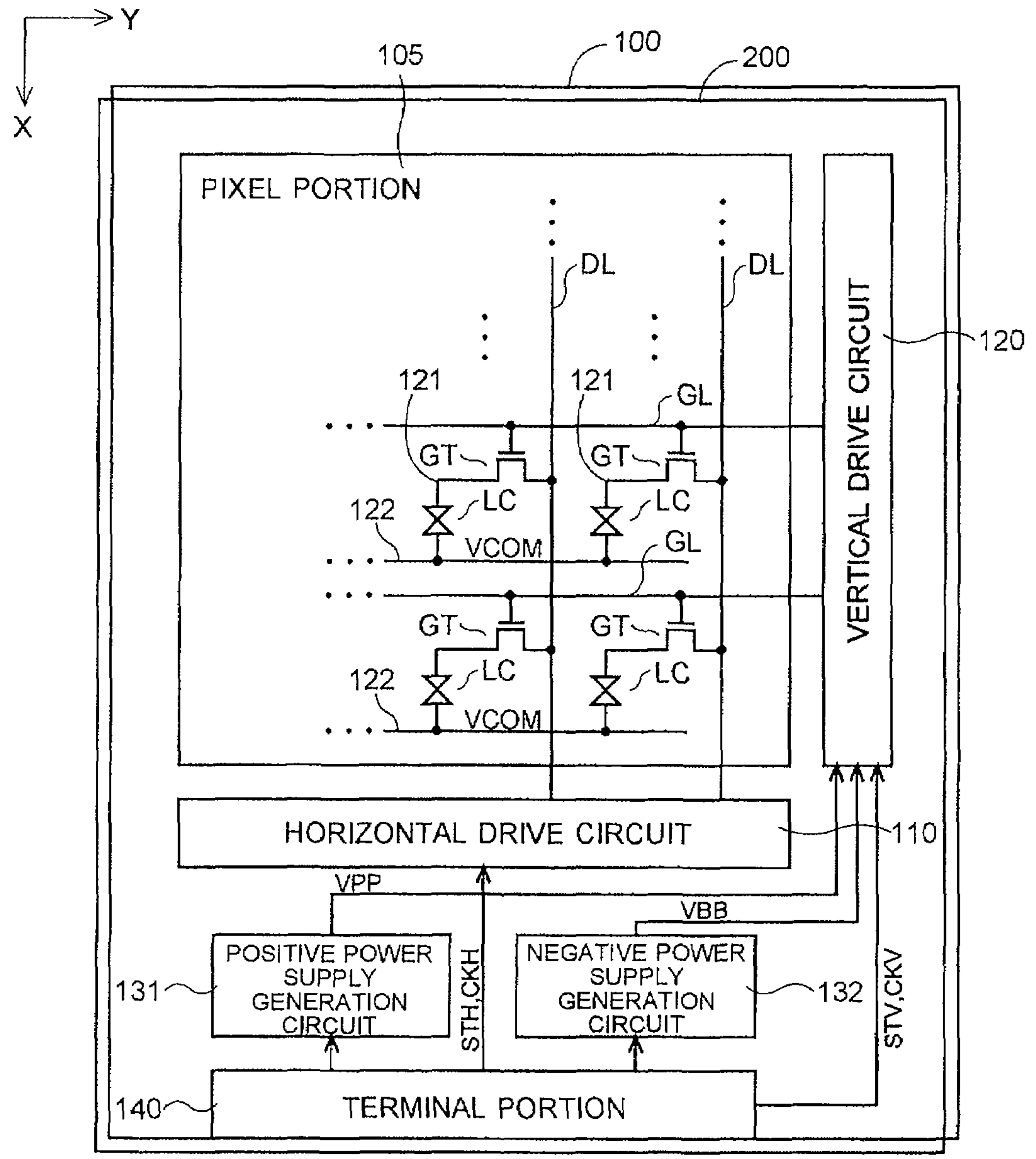
FIG. 1 shows a layout of a liquid crystal display device according to a first embodiment of this invention.

Embodiments of this invention will be described referring to the drawings.

First Embodiment

FIG. 1 shows a layout (plan view) of a liquid crystal display device according to a first embodiment of this invention. A pixel portion 105, a horizontal drive circuit 110 and a vertical drive circuit 120 are formed on a TFT glass substrate 100. A plurality of pixels (Only four pixels are shown in FIG. 1.) is arrayed in a matrix form in the pixel portion 105.

Figure 2:
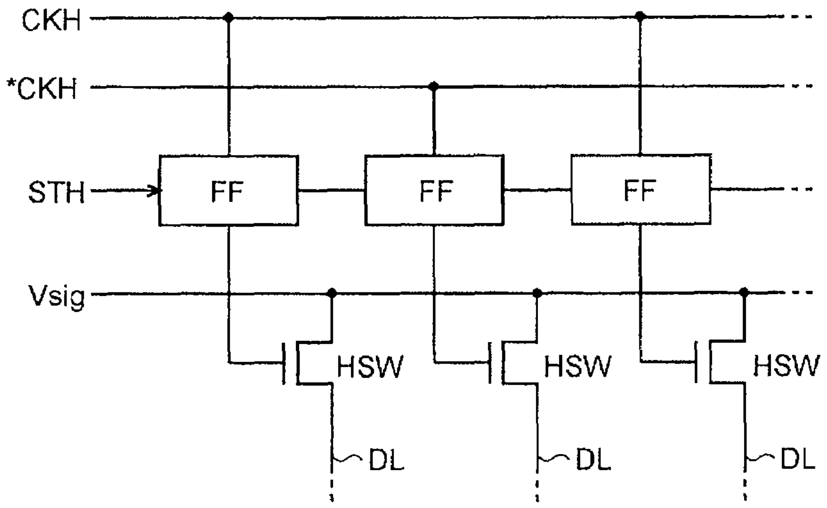
FIG. 2 is a circuit diagram of a horizontal drive circuit.

The horizontal drive circuit 110 is provided with a shift register SR that is made of a plurality of flip-flops FF and transfers a horizontal start signal STH based on a horizontal clock CKH and its reverse clock *CKH and a plurality of horizontal switches HSW, each of which is turned on based on an output of each of the flip-flops FF, as shown in FIG. 2. Each of the horizontal switches HSW is made of a TFT having a gate to which the output of corresponding each of the flip-flops FF is applied, a source to which a video signal Vsig is applied and a drain connected with a data line DL. That is, each of the horizontal switches HSW is turned on in a sequential order based on the output of corresponding each of the flip-flops FF to sample and output the video signal Vsig to the data line DL.

The vertical drive circuit 120 is a shift register that sequentially transfers a vertical start signal STV based on a vertical transfer clock CKV and provides each of gate lines GL with a gate signal corresponding to its output.

A pixel transistor GT in each of the pixels is made of a TFT having a drain connected with corresponding each of the data lines DL and a gate connected with corresponding each of the gate lines GL, and is controlled to turn on/off by the gate signal. A source of the pixel transistor GT is connected with a pixel electrode 121. The pixel electrode 121 is usually provided with a retention capacitor (not shown) to retain its electric potential.

A counter glass substrate 200 is disposed to face the TFT glass substrate 100. A common electrode 122 is formed on the counter glass substrate 200 so as to face the pixel electrodes 121. A liquid crystal LC is sealed between the TFT glass substrate 100 and the counter glass substrate 200.

A driver IC disposed on the TFT glass substrate 100 of the liquid crystal panel or outside the liquid crystal panel provides the common electrode 122 with a common electrode signal VCOM that alternates between an H level and an L level once every horizontal period for line inversion drive.

In the case where the pixel transistor GT is of N-channel type, the pixel transistor GT is turned on when the gate signal turns to an H level. As a result, the video signal Vsig is applied from the data line DL to the pixel electrode 121 through the pixel transistor GT, and the display is performed by controlling alignment of the liquid crystal LC.

Since the common electrode signal VCOM alternates between the H level and the L level as described above, the electric potential of the pixel electrode 121 is changed by capacitive coupling through the liquid crystal LC. Regarding the above, the H level of the gate signal to turn on the pixel transistor GT is set at a positive power supply electric potential that is generated by boosting, and an L level of the gate signal to turn off the pixel transistor GT is set at a negative power supply electric potential. In order to generate the gate signal, a positive power supply generation circuit 131 that generates the positive power supply electric potential and a negative power supply generation circuit 132 that generates the negative power supply electric potential are formed on the TFT glass substrate 100.

The positive power supply generation circuit 131 boosts an input power supply electric potential VDD to generate an output electric potential VPP=2VDD that is equal to twice of the input power supply electric potential VDD. The negative power supply generation circuit 132 generates an output electric potential VBB=−VDD that is equal to the input power supply electric potential VDD multiplied by minus one. Note that this is for the case where circuit efficiency is 100%. In the embodiment of this invention, the positive power supply generation circuit 131 and the negative power supply generation circuit 132 are disposed close to a terminal portion 140, to which a drive clock and the input power supply electric potential are applied externally, so that wiring loads (resistive and capacitive loads associated with wirings to provide the power supply and the drive clock) of the positive power supply generation circuit 131 and the negative power supply generation circuit 132 are reduced to suppress reduction in the circuit efficiency. The terminal portion 140 is formed in an edge portion of the TFT glass substrate 100. That is, the positive power supply generation circuit 131 and the negative power supply generation circuit 132 are placed closer to the terminal portion 140 than primary circuits of the liquid crystal display device, which are the pixel portion 105, the horizontal drive circuit 110 and the vertical drive circuit 120. With this, a layout that minimizes the wiring loads is obtained.

It is preferable that the positive power supply generation circuit 131 and the negative power supply generation circuit 132 are placed next to each other at substantially the same distance from the terminal portion 140 and parallel to an edge of the TFT glass substrate 100, along which the terminal portion 140 is formed, so that the wiring loads are made equal to each other and the circuit efficiencies of the positive power supply generation circuit 131 and the negative power supply generation circuit 132 are balanced.

Figure 3:
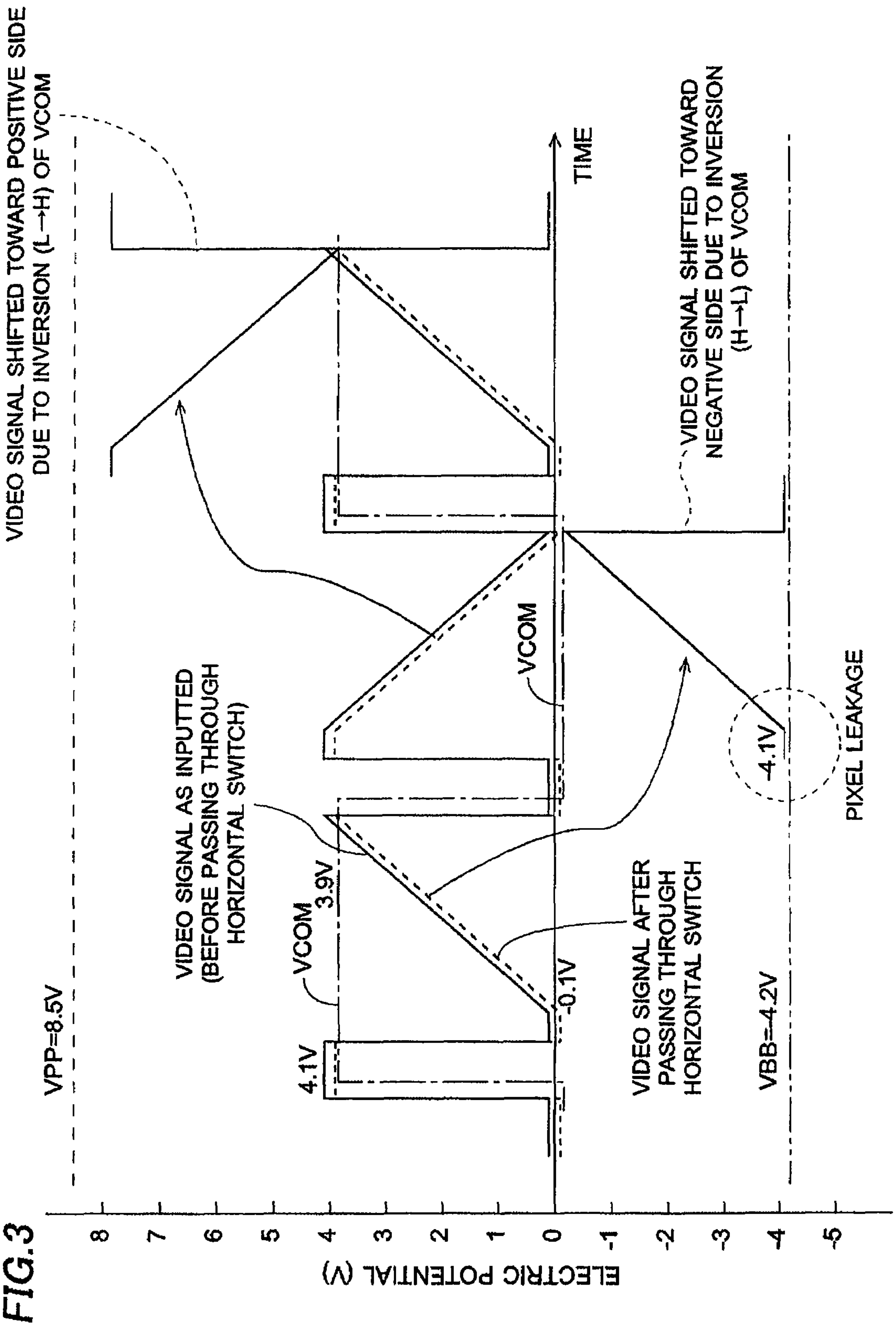
FIG. 3 is a waveform chart showing an operation of the liquid crystal display device according to the first embodiment of this invention.

An operation of the liquid crystal display device and an influence of the reduction in the circuit efficiency due to the wiring loads on the operation are described hereafter referring to FIG. 3. Now, when the input power supply electric potential VDD is 4.5 V and the circuit efficiency is assumed to be 100%, there is derived that VPP is 9.0 V and VBB is −4.5 V. In reality, however, VPP is about 8.5 V and VBB is about −4.2 V, for example, because there are voltage loss in the transistors in the circuit and voltage loss due to the wiring loads as described above. VPP makes the H level of the gate signal and VBB makes the L level of the gate signal.

The H level of the common electrode signal VCOM is 3.9 V and the L level of the common electrode signal VCOM is −0.1 V. A polarity of the video signal Vsig against the common electrode signal VCOM is inverted once every horizontal period. An H level of the video signal Vsig is set at 4.1 V and an L level of the video signal Vsig is set at 0.1 V. Because of a voltage drop due to a resistance of the horizontal switch HSW, the H level is reduced to 3.9 V and the L level is reduced to −0.1 V after passing through the horizontal switch HSW. The pixel transistors GT are of N-channel type in the explanation below.

When the video signal Vsig is to be written into a pixel in a certain row in the pixel portion 105 during a certain horizontal period, the gate signal corresponding to the row is set at the H level. Then, the pixel transistors GT in the row are turned on and the video signal Vsig is written into each of the pixels through the pixel transistor GT and retained in the pixel electrode 121.

In a subsequent horizontal period, the gate signal of the row turns to the L level and the pixel transistors GT are turned off. At that time, in the case where the common electrode signal VCOM changes from the L level to the H level, an electric potential of the pixel electrode 121 is changed by +4.0 V toward positive direction by the capacitive coupling, and in the case where the common electrode signal VCOM changes from the H level to the L level, the electric potential of the pixel electrode 121 is changed by −4.0 V by the capacitive coupling.

When VDD is reduced by increased loads of the wirings to provide the input power supply electric potential VDD and the drive clock, the output electric potential VPP from the positive power supply generation circuit 131 is reduced and the H level of the gate signal is also reduced accordingly. As a result, a voltage margin of the video signal Vsig in the programming operation is reduced. In the example shown in FIG. 3, there is a margin comparatively large enough to turn on the pixel transistor GT, since VPP is 8.5 V and the highest electric potential of the video signal Vsig is 4.1 V (3.9 V after passing through the horizontal switch HSW). When the wiring loads are increased, however, VPP is further reduced to reduce the margin and the programming operation may end up in a malfunction.

Also, when the output electric potential VBB from the negative power supply generation circuit 132 is raised by the same reason, the L level of the gate signal is raised accordingly and the pixel transistor GT is not sufficiently turned off to prevent the leakage through the pixel transistor GT. When such a pixel leakage occurs, there are caused problems such that a correct picture is not displayed because the level of the video signal Vsig written into the pixel is changed.

In the example shown in FIG. 3, when the electric potential of the pixel 121 is changed toward negative direction by the capacitive coupling after the video signal Vsig has been written in, the lowest electric potential of the pixel electrode 121 becomes −4.1 V which leaves only a small margin of −0.1 V against VBB=−4.2 V. That is, VBB has only a small margin against VPP. It is especially important for prevention of the pixel leakage that the negative power supply generation circuit 132 is placed close to the terminal portion 140 to minimize the wiring load.

Figure 4:
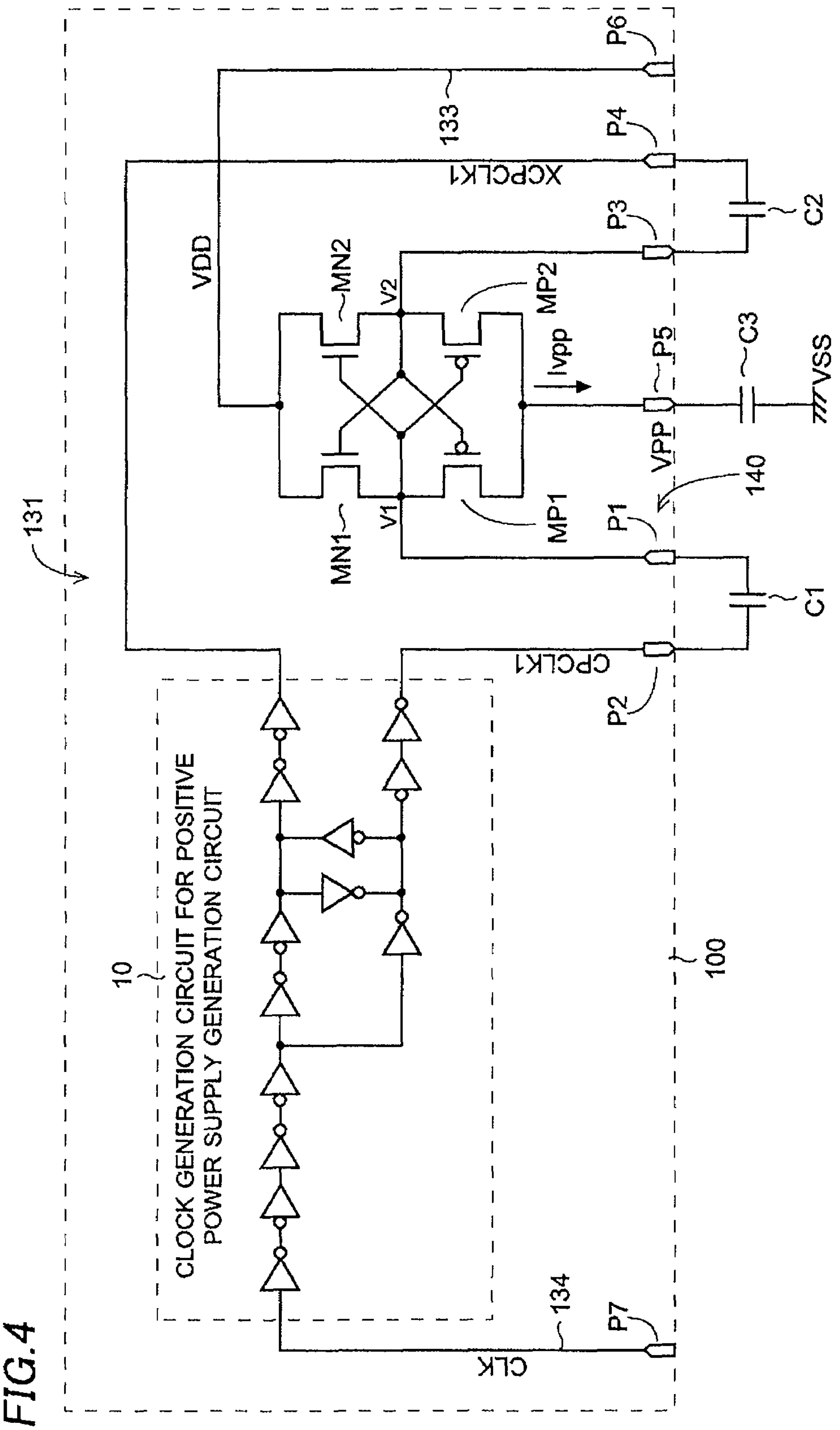
FIG. 4 is a circuit diagram of a positive power supply generation circuit.

Next, an example of concrete circuit structures of the positive power supply generation circuit 131 and the negative power supply generation circuit 132 are described. FIG. 4 is a circuit diagram showing the positive power supply generation circuit 131. A clock generation circuit 10 in the positive power supply generation circuit 131 is a buffer circuit composed of a plurality of inverters, and generates based on an input clock CLK (drive clock) a clock CPCLK1 having amplitude of VDD (H level=VDD and L level=VSS=0 V) and a reverse clock XCPCLK1 that is an inversion of the clock CPCLK1. The horizontal transfer clock CKH, the vertical transfer clock CKV, the common electrode signal VCOM or the like can be used as the input clock CLK. The clock CPCLK1 is applied to a first terminal of a flying capacitor C1 while the reverse clock XPCLK1 is applied to a first terminal of a flying capacitor C2. The buffer circuit such as the clock generation circuit 10 in the positive power supply generation circuit 131 is not necessarily required when the input clock CLK (drive clock) is directly inputted from an external IC through the terminal portion 140.

An N-channel type charge transfer transistor MN1 and a P-channel type charge transfer transistor MP1 are connected in series and a connecting node between them is connected with a second terminal of the flying capacitor C1. A gate of the N-channel type charge transfer transistor MN1 and a gate of the P-channel type charge transfer transistor MP1 are connected with a second terminal of the flying capacitor C2.

An N-channel type charge transfer transistor MN2 and a P-channel type charge transfer transistor MP2 are connected in series and a connecting node between them is connected with the second terminal of the flying capacitor C2. A gate of the N-channel type charge transfer transistor MN2 and a gate of the P-channel type charge transfer transistor MP2 are connected with the second terminal of the flying capacitor C1. The flying capacitor C1 is connected between external connection terminals P1 and P2 and placed outside the TFT glass substrate 100. (hereafter referred to as an external capacitor) The flying capacitor C2 is an external capacitor connected between external connection terminals P3 and P4.

The positive input power supply electric potential VDD is applied as an input electric potential to a common source of the N-channel type charge transfer transistors MN1 and MN2. Assuming that the circuit efficiency is 100%, a positive electric potential of 2VDD is outputted as the output electric potential VPP as well as an output current Ivpp from a common drain (output terminal) of the P-channel type charge transfer transistors MP1 and MP2 by charge transfer operation in a steady state. A smoothing capacitor C3 is another external capacitor, and is connected with an external connection terminal P5 that is an output terminal of the positive power supply generation circuit 131.

The external connection terminals P1-P5 are placed in the terminal portion 140. In addition, an external connection terminal P6 to apply the input power supply electric potential VDD from outside and an external connection terminal P7 to apply the input clock CLK from outside are placed in the terminal portion 140. A power supply wiring 133 to supply the input power supply electric potential VDD connects between the external connection terminal P6 and the common source of the N-channel type charge transfer transistors MN1 and MN2. A drive clock wiring 134 to supply the input clock CLK connects between the external connection terminal P7 and the clock generation circuit 10 in the positive power supply generation circuit 131. According to the layout described above, wiring lengths of the power supply wiring 133 and the drive clock wiring 134 are minimized to minimize the wiring loads.

Figure 5:
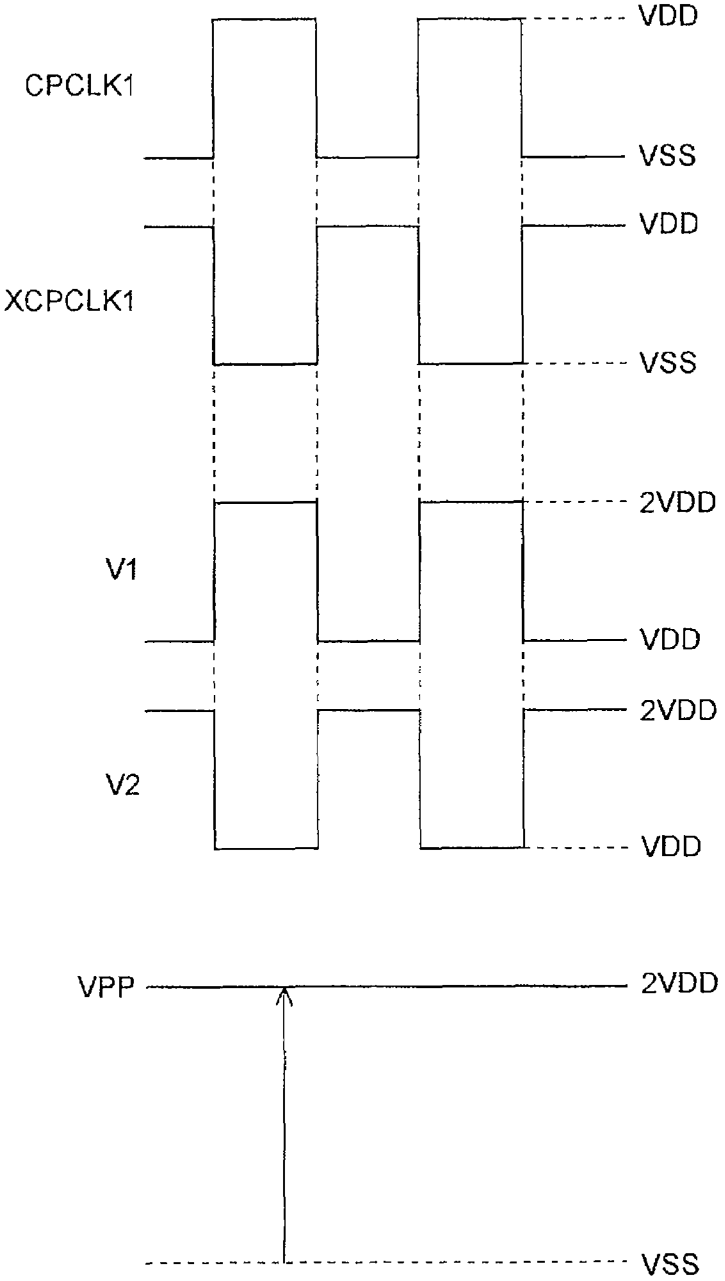
FIG. 5 is a waveform chart showing an operation of the positive power supply generation circuit.

An operation of the positive power supply generation circuit 131 in a steady state of VPP=2VDD is described hereafter, referring to a waveform chart shown in FIG. 5. When the clock CPCLK1 is at an H level (VDD), the reverse clock XCPCLK1 is at an L level (VSS), MN1 and MP2 are turned off, MN2 and MP1 are turned on and an electric potential V1 at the connecting node between MN1 and MP1 is boosted by the capacitive coupling to 2VDD that is outputted through MP1. Meantime, an electric potential V2 at the connecting node between MN2 and MP2 is charged to VDD.

Next, when the clock CPCLK1 turns to the L level (VSS), MN1 and MP2 are turned on, MN2 and MP1 are turned off, and the electric potential V2 is boosted by capacitive coupling through the flying capacitor C2 to 2VDD that is outputted through MP2. Meantime, the electric potential V1 is charge to VDD. That is, the electric potential 2VDD is outputted alternately from left and right serially connected transistor circuits in the positive power supply generation circuit 131. Note that this is for the case where the circuit efficiency is 100%.

Figure 6:
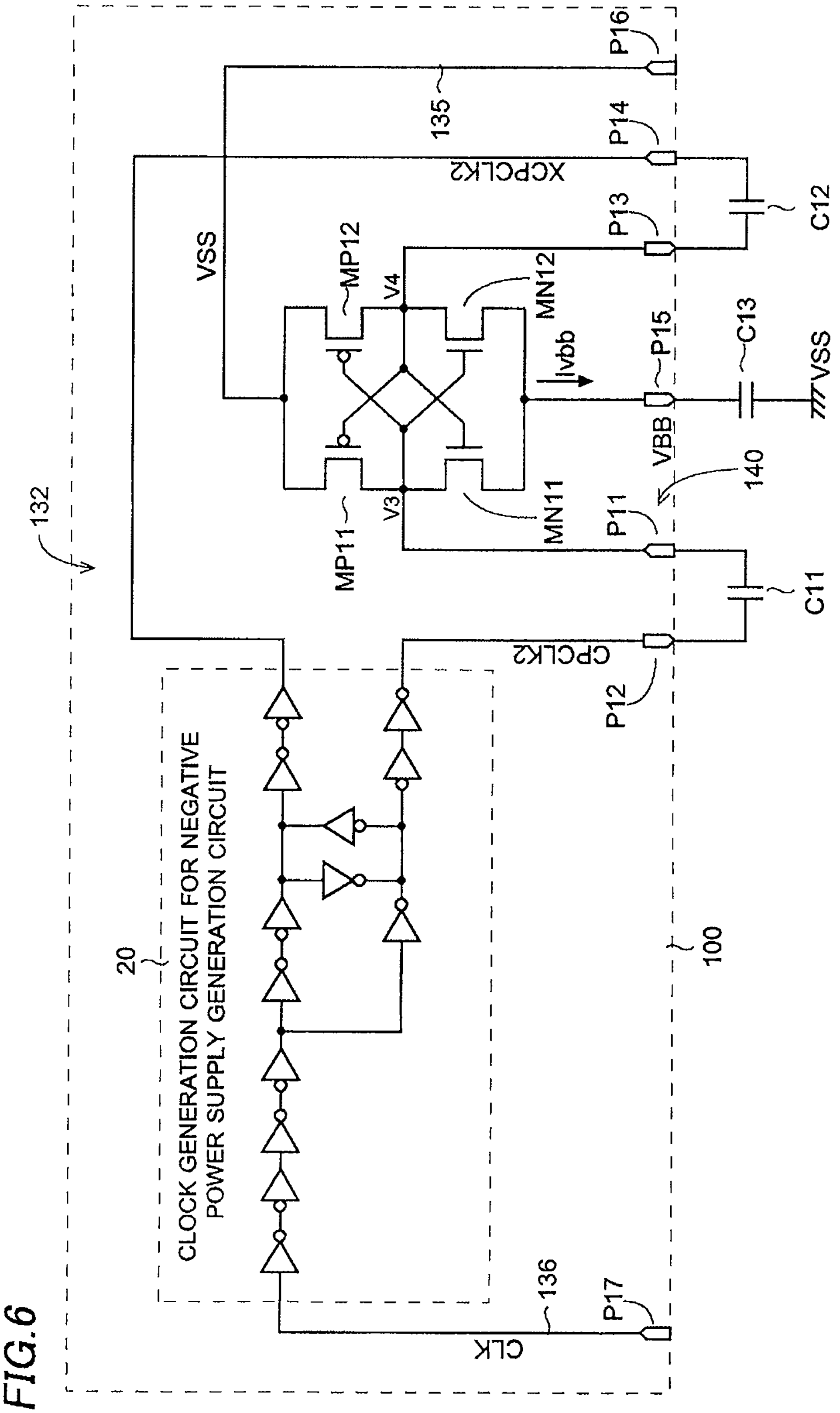
FIG. 6 is a circuit diagram of a negative power supply generation circuit.

FIG. 6 is a circuit diagram showing the negative power supply generation circuit 132. A clock generation circuit 20 in the negative power supply generation circuit 132 generates based on the input clock CLK a clock CPCLK2 having amplitude of VDD and a reverse clock XCPCLK2 that is an inversion of the clock CPCLK2. The clock generation circuit 20 does not need to be provided separately, and the clock generation circuit 10 may be shared by both the positive power supply generation circuit 131 and the negative power supply generation circuit 131.

An N-channel type charge transfer transistor MN11 and a P-channel type charge transfer transistor MP11 are connected in series and a connecting node between them is connected with a second terminal of a flying capacitor C11. A gate of the N-channel type charge transfer transistor MN11 and a gate of the P-channel type charge transfer transistor MP11 are connected with a second terminal of a flying capacitor C12.

An N-channel type charge transfer transistor MN12 and a P-channel type charge transfer transistor MP12 are connected in series and a connecting node between them is connected with the second terminal of the flying capacitor C12. A gate of the N-channel type charge transfer transistor MN12 and a gate of the P-channel type charge transfer transistor MP12 are connected with the second terminal of the flying capacitor C11. The flying capacitor C11 is an external capacitor connected between external connection terminals P11 and P12. The flying capacitor C12 is an external capacitor connected between external connection terminals P13 and P14.

The ground electric potential VSS is applied to a common source of the P-channel type charge transfer transistors MP11 and MP12 as an input electric potential. When electric potential loss in the transistor is neglected, a negative electric potential of −VDD is outputted as the output electric potential VBB as well as an output current Ivbb from a common drain (output terminal) of the N-channel type charge transfer transistors MN11 and MN12 in a steady state. A smoothing capacitor C13 is another external capacitor, and is connected with an external connection terminal P15 that is the output terminal of the negative power supply generation circuit 132.

The external connection terminals P11-P15 are placed in the terminal portion 140. In addition, an external connection terminal P16 to apply the input power supply electric potential VSS from outside and an external connection terminal P17 to apply the input clock CLK from outside are placed in the terminal portion 140. The external connection terminal P7 for the positive power supply generation circuit 131 may be shared by the negative power supply generation circuit 132 to replace the external connection terminal P17.

A power supply wiring 135 to supply the input power supply electric potential VSS connects between the external connection terminal P16 and the common source of the P-channel type charge transfer transistors MP11 and MP12. A drive clock wiring 136 to supply the input clock CLK connects between the external connection terminal P17 and the clock generation circuit 20 in the negative power supply generation circuit 132. According to the layout described above, wiring lengths of the power supply wiring 135 and the drive clock wiring 136 are minimized to minimize the wiring loads.

Figure 7:
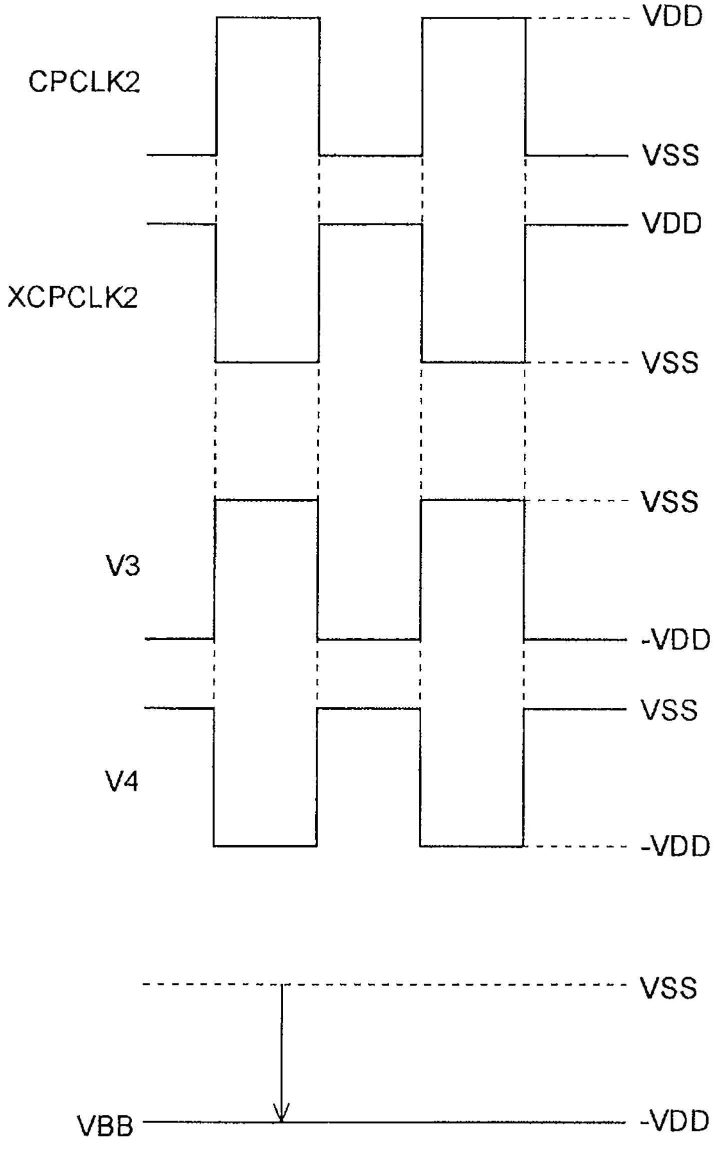
FIG. 7 is a waveform chart showing an operation of the negative power supply generation circuit.

An operation of the negative power supply generation circuit 132 in a steady state of VBB=−VDD is described hereafter, referring to FIG. 7. When the clock CPCLK2 is at the H level (VDD), the reverse clock XCPCLK2 is at the L level (VSS), MN11 and MP12 are turned off, MN12 and MP11 are turned on, an electric potential V3 at the connecting node between MN11 and MP11 is charged to VSS and an electric potential V4 at the connecting node between MN12 and MP12 is lowered by the capacitive coupling through the flying capacitor C12 to −VDD that is outputted through MN12.

When the clock CPCLK2 turns to the L level (VSS), MN11 and MP12 are turned on, MN12 and MP11 are turned off, and the electric potential V3 is lowered by capacitive coupling through the flying capacitor C11 to −VDD that is outputted through MN11. Meantime, the electric potential V4 is charge to Vss. That is, the electric potential −VDD is outputted alternately from left and right serially connected transistor circuits in the negative power supply generation circuit 132. Note that this is for the case where the circuit efficiency is 100%.

Figure 8:
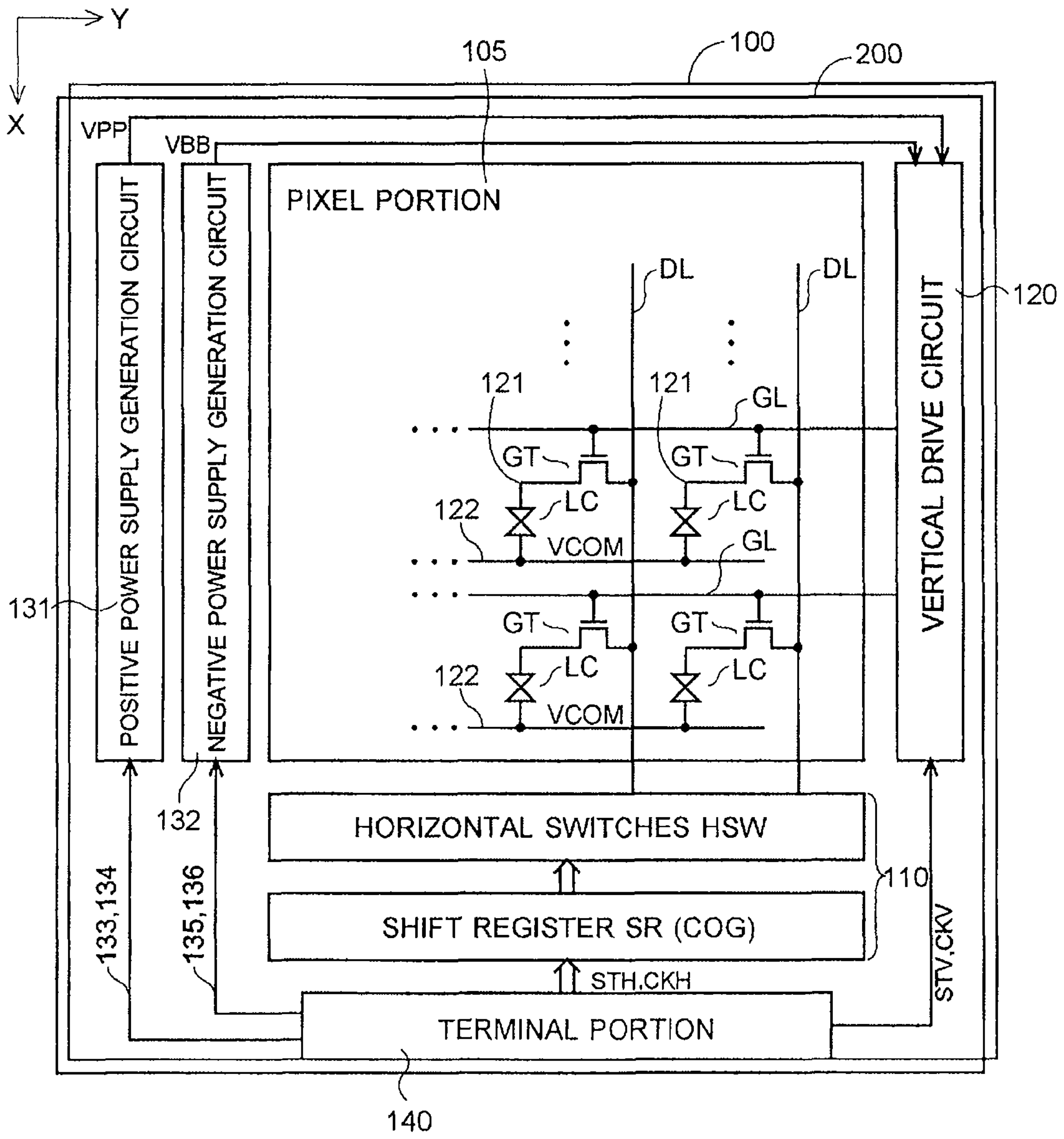
FIG. 8 shows a layout of a liquid crystal display device according to a second embodiment of this invention.

FIG. 8 shows a layout (plan view) of a liquid crystal display device according to a second embodiment of this invention. The layout according to the second embodiment is effective in the case where it is difficult to place the positive power supply generation circuit 131 and the negative power supply generation circuit 132 closer to the terminal portion 140 than other circuits as in the liquid crystal display device according to the first embodiment. That is, when the shift register SR in the horizontal drive circuit 110 is mounted as an LSI chip on the TFT glass substrate 100, i.e. as a COG (Chip on Glass), there is a case in which the positive power supply generation circuit 131 and the negative power supply generation circuit 32 can not be placed as close to the terminal portion 140 as in the liquid crystal display device according to the first embodiment because the frame area is increased accordingly.

Thus, the positive power supply generation circuit 131 and the negative power supply generation circuit 132 are arrayed next to each other in a direction (Y direction) of an edge of the TFT glass substrate 100, on which the terminal portion 140 is placed, and placed along an edge that is perpendicular to the edge of the TFT glass substrate 100, on which the terminal portion 140 is placed, as shown in FIG. 8. Although the positive power supply generation circuit 131 is placed on the edge portion of the TFT glass substrate 100 and the negative power supply generation circuit 132 is placed between the positive power supply generation circuit 131 and the pixel portion 105 in FIG. 8, the negative power supply generation circuit 132 may be placed on the edge portion of the TFT glass substrate 100 and the positive power supply generation circuit 131 may be placed between the negative power supply generation circuit 132 and the pixel portion 105. With the layout described above, the positive power supply generation circuit 131 and the negative power supply generation circuit 132 are placed at substantially the same distance from the terminal portion 140. As a result, the reduction in the circuit efficiency of either the positive power supply generation circuit 131 or the negative power supply generation circuit 132 due to the unbalanced wiring loads can be prevented.

Third Embodiment

Figure 9:
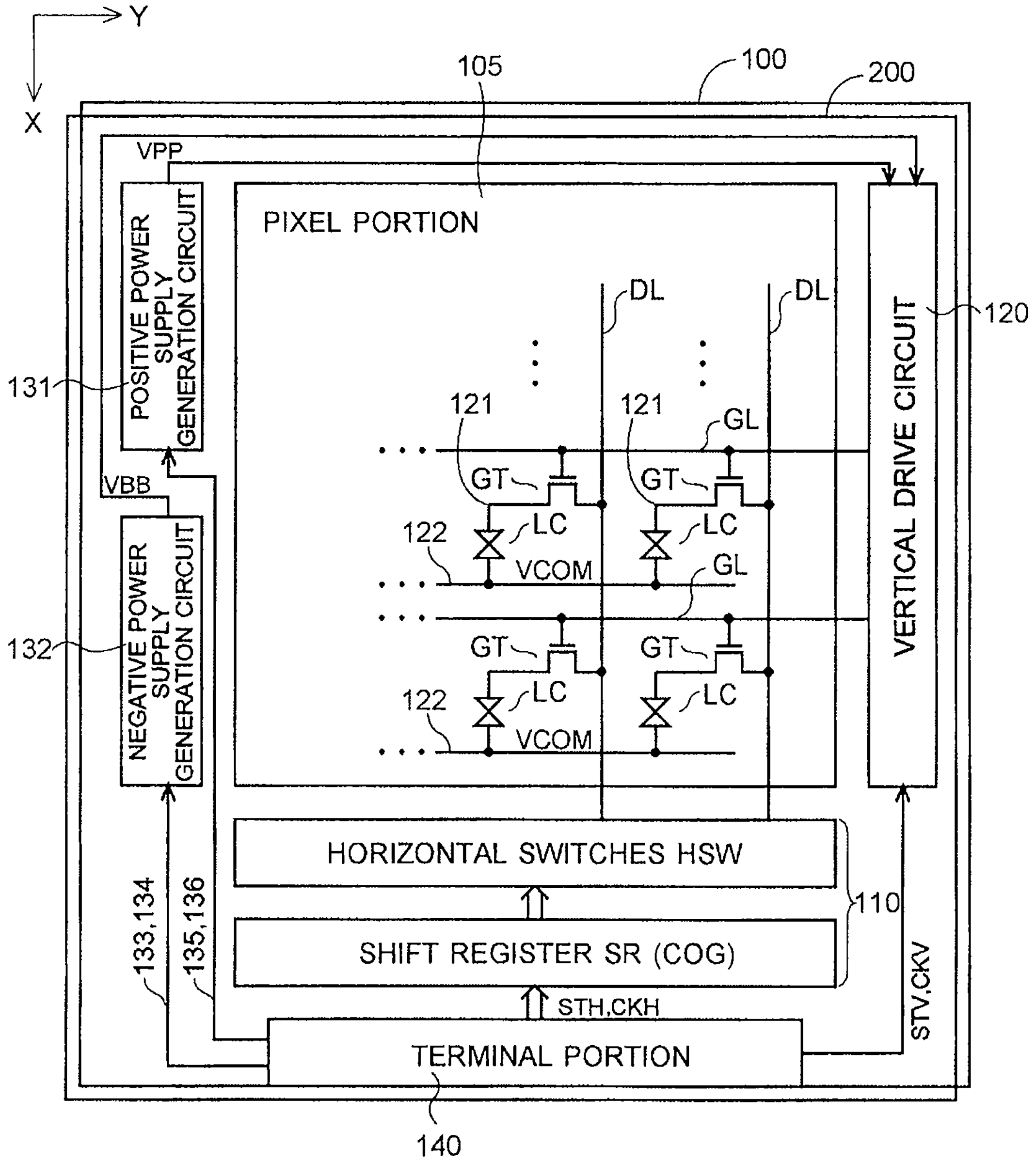
FIG. 9 shows a layout of a liquid crystal display device according to a third embodiment of this invention.

FIG. 9 shows a layout (plan view) of a liquid crystal display device according to a third embodiment of this invention. In this embodiment, the positive power supply generation circuit 131 and the negative power supply generation circuit 132 are placed side by side along the edge perpendicular to the edge of the TFT glass substrate 100, on which the terminal portion 140 is placed, i.e. along X direction in FIG. 9, and the negative power supply generation circuit 132 is placed closer to the terminal portion 140 than the positive power supply generation circuit 131. The layout described above is effective in the case where a left portion of the frame area in FIG. 9 is too narrow to apply the layout as described in the second embodiment.

As described in the first embodiment, the pixel leakage would be caused when the output electric potential VBB generated by the negative power supply generation circuit 132 rises. And there is only a small margin against the rise in VBB. On the other hand, although insufficient programming of the video signal Vsig into the pixel would occur when the output electric potential VPP generated by the positive power supply generation circuit 131 falls, the margin against the fall in VPP is relatively large.

In the third embodiment of this invention, noting a difference between the margin regarding the positive power supply generation circuit 131 and the margin regarding the negative power supply generation circuit 132, the negative power supply generation circuit 132 that has less margin is placed closer to the terminal portion 140 than the positive power supply generation circuit 131 to prevent the problem due to the reduction in the circuit efficiency.

[Electronic Equipment]

The liquid crystal display device according to each of the embodiments described above is used as a display device mounted on electronic equipment. The electronic equipment means a monitor, a TV, a note PC, a PDA (Personal Digital Assistant), a digital still camera, a camcorder, a mobile telephone, a mobile photo viewer, a mobile video player, a mobile DVD player, a mobile audio player or the like.

The liquid crystal display devices are taken up as examples and explained in the embodiments described above. However, this invention is not limited to the above and is applicable to display devices other than the liquid crystal display devices such as an LED (Light Emitting Diode), an EL (Electro-Luminescence), a VFD (Vacuum Fluorescent Display) and a PDP (Plasma Display Panel), for example, since this invention is related to placement of the power supply circuit.

With the display device and the electronic equipment according to the embodiments of this invention, the reduction in the efficiency of the power supply circuit is prevented so that the increase in the power consumption, the malfunction of the display device and the like can be prevented.

What is claimed is:

1. A display device comprising:

a pixel portion comprising a plurality of pixel transistors arrayed in a matrix form;

a pixel electrode to which a video signal is applied through a pixel transistor, a polarity of the video signal being switched with a predetermined period;

a drive circuit to drive the pixel transistors, the drive circuit including a vertical drive circuit for providing a gate signal to turn on and off the pixel transistors and a horizontal drive circuit for providing the video signal;

a terminal portion to externally provide the positive power supply generation circuit and the negative power supply generation circuit a power supply electric potential having a first magnitude;

a positive power supply generation circuit to generate a positive power supply electric potential that is supplied to the vertical drive circuit, wherein the positive power supply electric potential is generated by boosting the power supply electric potential having the first magnitude to a second magnitude that is greater than the first magnitude, and the positive power supply electric potential having the second magnitude is output from the positive power supply generation circuit;

a negative power supply generation circuit to generate a negative power supply electric potential that is supplied to the vertical drive circuit, wherein the negative power supply electric potential is generated by converting the power supply electric potential having the first magnitude to a negative electric potential having a third magnitude, and the negative power supply electric potential having the third magnitude is output from the negative power supply generation circuit;

a first wiring to supply the power supply electric potential from the terminal portion, the first wiring being arranged between the terminal portion and both the positive power supply generation circuit and the negative power supply generation circuit;

a second wiring to supply a horizontal start signal and a horizontal clock from the terminal portion to the horizontal drive circuit, the second wiring being arranged between the positive power supply generation circuit and the negative power supply generation circuit; and a substrate on which the pixel portion, the pixel electrode, the drive circuit, the positive power supply generation circuit, the negative power supply generation circuit, the terminal portion, and the first and second wirings are arranged, wherein the second magnitude is greater than a fourth magnitude of a highest level of positive electric potential of a video signal applied to the pixel electrode, and the third magnitude is greater than a fifth magnitude of a lowest level of negative electric potential of the video signal applied to the pixel electrode, and wherein the positive power supply generation circuit and the negative power supply generation circuit are arranged closer to the terminal portion than the pixel portion and the drive circuit, and a distance from the terminal portion to the positive power supply generation circuit is substantially the same as a distance from the terminal portion to the negative power supply generation circuit.

2. The display device of claim 1, further comprising a common electrode arranged to face the pixel electrode and receiving a common electrode signal that alternates between a high level and a low level and a liquid crystal arranged between the pixel electrode and the common electrode.

3. The display device of claim 1, wherein the positive power supply generation circuit and the negative power supply generation circuit are arranged he next to each other in a direction parallel to an edge of a substrate along which the terminal portion is arranged.

4. The display device of claim 1, wherein a wiring load from the terminal portion to the positive power supply generation circuit is equal to a wiring load from the terminal portion to the negative power supply generation circuit.

5. The display device of claim 1, wherein the drive circuit to drive the pixel transistors is arranged on the substrate in a form of an LSI chip.

6. Electronic equipment comprising a display device, the display device comprising, a pixel portion comprising a plurality of pixel transistors arrayed in a matrix form, a pixel electrode to which a video signal is applied through a pixel transistor, a polarity of the video signal being switched with a predetermined period, a drive circuit to drive the pixel transistors, the drive circuit including a vertical drive circuit for providing a gate signal to turn on and off the pixel transistors and a horizontal drive circuit for providing the video signal, a terminal portion to externally provide the positive power supply generation circuit and the negative power supply generation circuit with a power supply electric potential having a first magnitude, a positive power supply generation circuit to generate a positive power supply electric potential that is supplied to the vertical drive circuit, wherein the positive power supply electric potential is generated by boosting the power supply electric potential having the first magnitude to a second magnitude that is greater than the first magnitude, and the positive power supply electric potential having the second magnitude is output from the positive power supply generation circuit, a negative power supply generation circuit to generate a negative power supply electric potential that is supplied to the vertical drive circuit, wherein the negative power supply electric potential is generated by converting the power supply electric potential having the first magnitude to a negative electric potential having a third magnitude, and the negative power supply electric potential having the third magnitude is output from the negative power supply generation circuit, a first wiring to supply the power supply electric potential from the terminal portion, the first wiring being arranged between the terminal portion and both the positive power supply generation circuit and the negative power supply generation circuit, a second wiring to supply a horizontal start signal and a horizontal clock from the terminal portion to the horizontal drive circuit, the second wiring being arranged between the positive power supply generation circuit and the negative power supply generation circuit, and a substrate on which the pixel portion, the pixel electrode, the drive circuit, the positive power supply generation circuit, the negative power supply generation circuit, the terminal portion, and the first and second wirings are arranged, wherein the second magnitude is greater than a fourth magnitude of a highest level of positive electric potential of a video signal applied to the pixel electrode, and the third magnitude is greater than a fifth magnitude of a lowest level of negative electric potential of the video signal applied to the pixel electrode, and wherein the positive power supply generation circuit and the negative power supply generation circuit are arranged closer to the terminal portion than the pixel portion and the drive circuit, and a distance from the terminal portion to the positive power supply generation circuit is substantially the same as a distance from the terminal portion to the negative power supply generation circuit.

* * * * *